United States Patent
Gregor et al.

(10) Patent No.: US 6,320,183 B1
(45) Date of Patent: Nov. 20, 2001

(54) PRODUCT SENSORS FOR AIR SEEDER

(75) Inventors: David Walter Gregor; Steve Blaine Detrick, both of Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/340,968

(22) Filed: Jun. 28, 1999

(51) Int. Cl.[7] .................................................. H01J 40/14
(52) U.S. Cl. .................................. 250/222.1; 250/223 R
(58) Field of Search ............................... 250/221, 222.1, 250/223 R; 111/174, 175, 176, 177, 178, 179, 180, 181, 186, 200; 221/266; 222/142, 273, 368; 340/684; 701/50; 406/30, 132, 144

(56) References Cited

U.S. PATENT DOCUMENTS

| 5,601,209 | * 2/1997 | Barsi et al. ........................... 221/266 |
| 5,650,609 | 7/1997 | Mertins et al. .................... 250/222.2 |
| 5,847,389 | 12/1998 | Mertins et al. .................... 250/222.2 |
| 5,855,303 | 1/1999 | Gregor ................................. 222/368 |
| 5,969,340 | * 10/1999 | Dragne et al. ..................... 250/223 R |

OTHER PUBLICATIONS

Four pictures of Concord air seeder having product sensors located above the meter roller section. (No Date Provided).

* cited by examiner

Primary Examiner—John R. Lee

(57) ABSTRACT

The product meter of an air seeder is vertically positioned between a product tank and a primary air distribution manifold. The product meter is provided with an inlet passage and an outlet passage. Product from the product tank is received in the inlet passage where it is directed to the metering chamber. A meter roller is located in the metering chamber for metering the product received from the product tank. After the product has been metered it is transported though the outlet passage to the primary distribution manifold. Optical product sensors may be located in either the inlet passage or the outlet passage to detect the operation of the product meter.

6 Claims, 2 Drawing Sheets

PRODUCT SENSORS FOR AIR SEEDER

BACKGROUND OF THE INVENTION

1. Field of the Invention

The present invention is directed to improved optical sensor locations in the product meter of an air seeder.

2. Description of the Prior Art

Air seeders are commonly towed by tractors to apply seed and/or fertilizer to a field. As an example, an air seeder may be towed in combination with a tilling implement, one behind the other, to place seed and fertilizer under the surface of the soil. An air seeder has as its central component a wheeled seed cart which comprises one or more frame-mounted product tanks for holding granular product, such as seed and/or fertilizer. Air seeders are also provided with product meters associated with each product tank for dispensing metered product from the respective product tank into a pneumatic distribution system for delivering the metered product to the field.

Typically, air seeders are provided with volumetric meters which measure a fixed volume of granular product per unit of linear distance. These volumetric meters typically comprise either augers or fluted cylinders (meter rollers). The product meters rotate to feed metered product into a pneumatic distribution system. The pneumatic distribution system of an air seeder generally utilizes a blower to provide at least one airstream which flows through the pneumatic distribution system to seed boots where product is deposited in the soil. Metered product is introduced into the air stream at a primary air distribution manifold located below the product meter. Product is carried by the air stream through distribution lines to a series of secondary distribution manifolds ("headers"), which in turn distribute product through individual lines to seed boots mounted behind ground openers on the tilling implement.

Current air seeders do not provide a method of sensing product flow in the meter. For positive pressure air systems, the product tank of the air seeder must be pressurized to meter product correctly. When pressure is lost in the tank, the flow of metered product would be slowed or even stop. Current sensors sense product flow downstream from the manifolds. In applications where two products from two separate tanks are metered into a single rank of tubes at different locations, the product flow from individual meters cannot be sensed because of the product meters being connected to the same air lines. One meter can stop metering while others continue to function properly thus giving no warning to the operator that the flow of one product has stopped or slowed because of the continual flow of product from the other meters.

SUMMARY

It is an object of the present invention to provide improved air seeder sensor by locating the sensors in the product meter itself.

It is a feature of the present invention that optical product sensors are located in either the inlet or outlet passage of the product meter.

The product meter of an air seeder is vertically positioned between a product tank and a primary air distribution manifold. The product meter is provided with an inlet passage and an outlet passage. Product from the product tank is received in the inlet passage where it is directed to the metering chamber. A meter roller is located in the metering chamber for metering the product received from the product tank. After the product has been metered it is transported though the outlet passage to the primary distribution manifold. Optical product sensors may be located in either the inlet passage or the outlet passage to detect the operation of the product meter.

DETAILED DESCRIPTION

Figure 1:
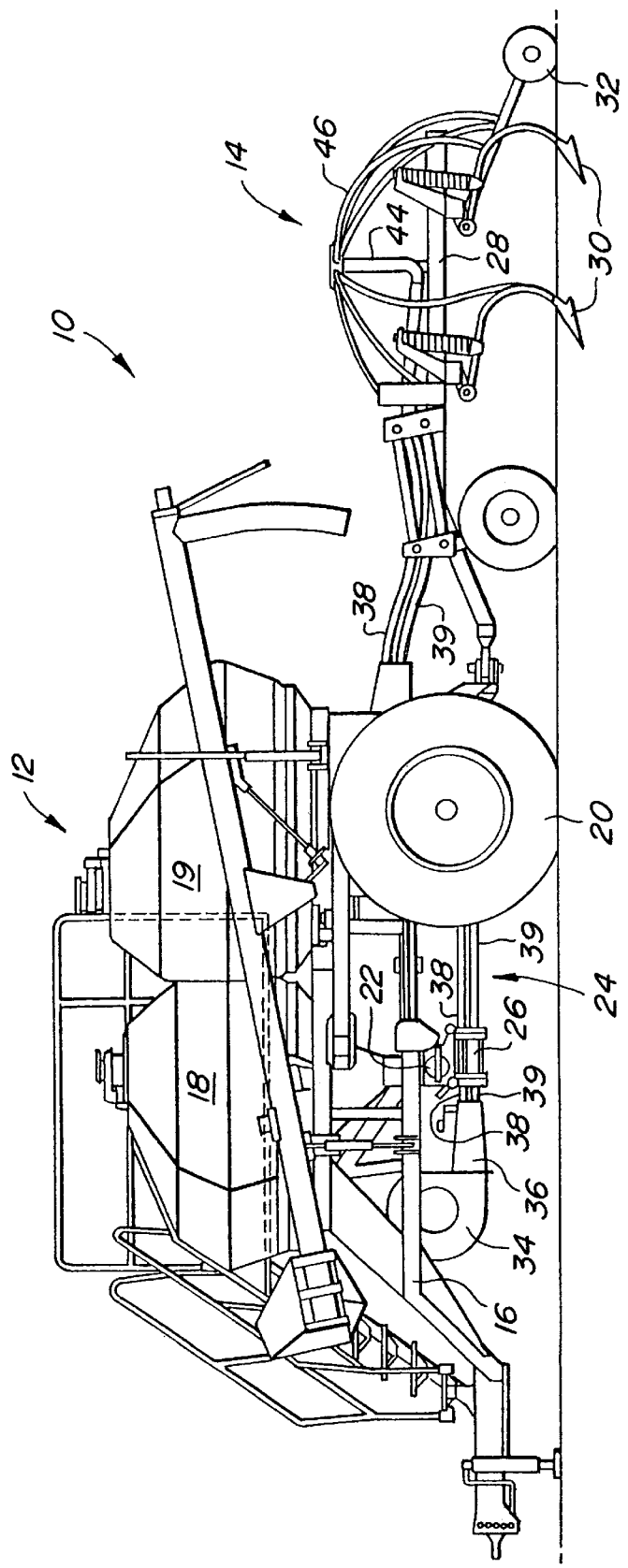
FIG. 1 is a side view of an air seeder.
Figure 2:
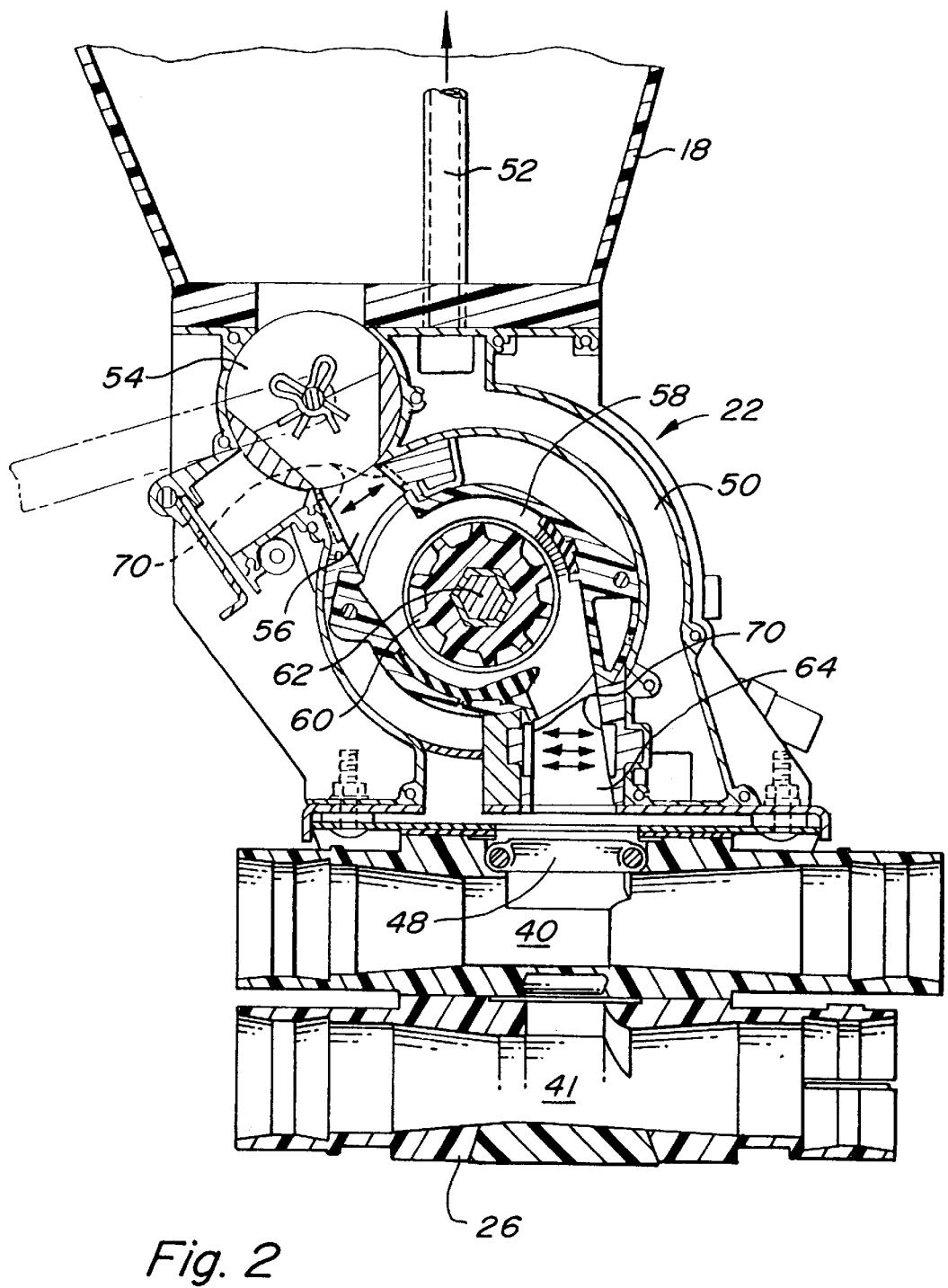
FIG. 2 is a cross sectional view of the product meter and the primary distribution manifold.

As shown in FIG. 1, air seeder 10 comprises a seed cart 12 and a tilling implement 14. The seed cart 12 is typically towed by a tractor through a field to be seeded. The seed cart 12 has a frame 16 supporting a first product tank 18 and a second product tank 19. Wheels 20 are rotatably mounted to the frame. Both product tanks 18 and 19 are provided with identical product meters 22 and primary air distribution manifolds 26. Only the product meter and primary distribution manifold associated with product tank 18 is illustrated. Both product meters 22 are located below the product tanks 18 and 19 and receive product therefrom for controlled feeding of product into a pneumatic distribution system 24. The primary air distribution manifolds 26 are located below the product meters 22. Both manifolds are part of the pneumatic distribution system 24. FIG. 1 illustrates a double shot air seeder wherein a first product contained in product tank 18 is directed to the top rank portion of the air stream and the second product contained in product tank 19 is directed to the bottom rank portion of the air stream. The tilling implement 14 is towed behind the seed cart 12 and comprises a frame 28 to which ground openers 30 are mounted. The tilling implement may be provided with seed row finishing equipment such as packers 32

The pneumatic distribution system 24 distributes metered product from the product tanks 18 and 19 to the ground openers 30. The product contained in the product tanks 18 and 19 may include seed, fertilizer or other granular products. The pneumatic distribution system 24 comprises a blower 34 driven by a hydraulic motor which directs a stream of pressurized air through an adjustable damper 36. The damper 36 in turn directs the modified air stream to a top rank of tubes 38 and to a bottom rank of tubes 39. Typically both ranks of tubes would include multiple tubes for receiving metered product. The top rank of tubes 38 directs the top rank portion of the air stream into the top rank of venturis 40 in the primary air distribution manifolds 26 associated with both product tanks. Similarly, the bottom rank of tubes 39 directs the bottom rank portion of the air stream into a bottom rank of venturis 41 in the primary distribution manifolds 26.

Each of the top rank tubes 38 that extend rearwardly from the primary distribution manifold associated with product tank 19 proceeds to an individual secondary air distribution manifold 44. Each of the secondary air distribution manifolds have individual tubes 46 which extend to the ground openers 30. Similarly each of the bottom rank of tubes 39 extend from the primary air distribution manifold 22 associated with the product tank 19 to an individual secondary air distribution manifold 44. The secondary air distribution manifolds 44 are identical and comprise an upwardly extending tube having a header which distributes the product contained in the air stream to the individual ground openers 30 through individual tubes 46.

Product from tanks 18 and 19 is metered by the respective product meter 22. The product enters the air stream through the venturis 40 or 41. The primary air distribution manifolds 26 are provided with a first selector valve 48 positioned between the first product meter 22 and the venturis 40 and 41 for selectively directing metered product to either the top rank venturi 40 or the bottom rank venturi 41. For example, product in tank 18 may be directed to the top rank air stream, and product in tank 19 maybe directed to the bottom rank air stream as dictated by the position of selector valve 48, Pressurized air from the air stream is used to pressurize the product tanks. More specifically, a portion of the air stream is directed through passage 50 in the product meter and into tube 52 for pressurizing tank 18.

Product in tank 18 is directed past shutoff valve 54 through inlet passage 56 into metering chamber 58 having a fluted metering roller 60 which is rotatively driven by hex shaft 62. The metered product is directed through outlet passage 64 to one of the venturis 40 or 41 depending upon the position of the selector valve 48.

Optical sensors 70 maybe located in inlet passage 56 or outlet passage 64 for sensing the passage of product through these passages. Outlet 64 is the more desirable location as a sensor located in this passage directly senses product flow from the product meter to the pneumatic distribution system 24. The optical sensors 70 may be of the type disclosed in U.S. Pat. Nos. 5,650,609 and 5,847,389 which are incorporated herein by reference.

The invention should not be limited to the above described embodiment, but should be limited solely to the claims that follow.

We claim:

1. A seed cart for an air seeder, the seed cart comprising:

a frame;

rotatable wheels mounted to the frame;

a product tank mounted to the frame for holding a granular product;

a product meter associated with the product tank for metering the product, the product meter having an outlet passage;

a primary air distribution manifold located below the product meter for receiving metered product from the outlet passage of the product meter, the primary air distribution manifold having a venturi;

a blower mounted to the frame for directing an air stream through the venturi for transporting the metered product received from the product meter; and a sensor mounted in the outlet passage for sensing the passage of metered product through the outlet passage as the metered product passes from the product meter to the primary air distribution manifold.

2. A seed cart as defined by claim 1 wherein the sensor is an optical sensor.

3. A seed cart as defined by claim 2 wherein the product tank is pressurized by the blower.

4. A seed cart as defined by claim 3 wherein the product meter comprises an inlet passage for receiving product from the product tank, a metering chamber positioned between the inlet passage and the outlet passage and a fluted metering roller rotatively positioned in the metering chamber.

5. A product meter for an air seeder, the product meter comprising:

a metering chamber having an inlet passage for receiving product and an outlet passage for dispensing metered product;

a rotatable meter roller located in the metering chamber; and a sensor mounted in the outlet passage for sensing the passage of metered product out of the metering chamber.

6. A product meter as defined by claim 5 wherein the sensor is an optical sensor.

* * * * *